UNITED STATES PATENT OFFICE.

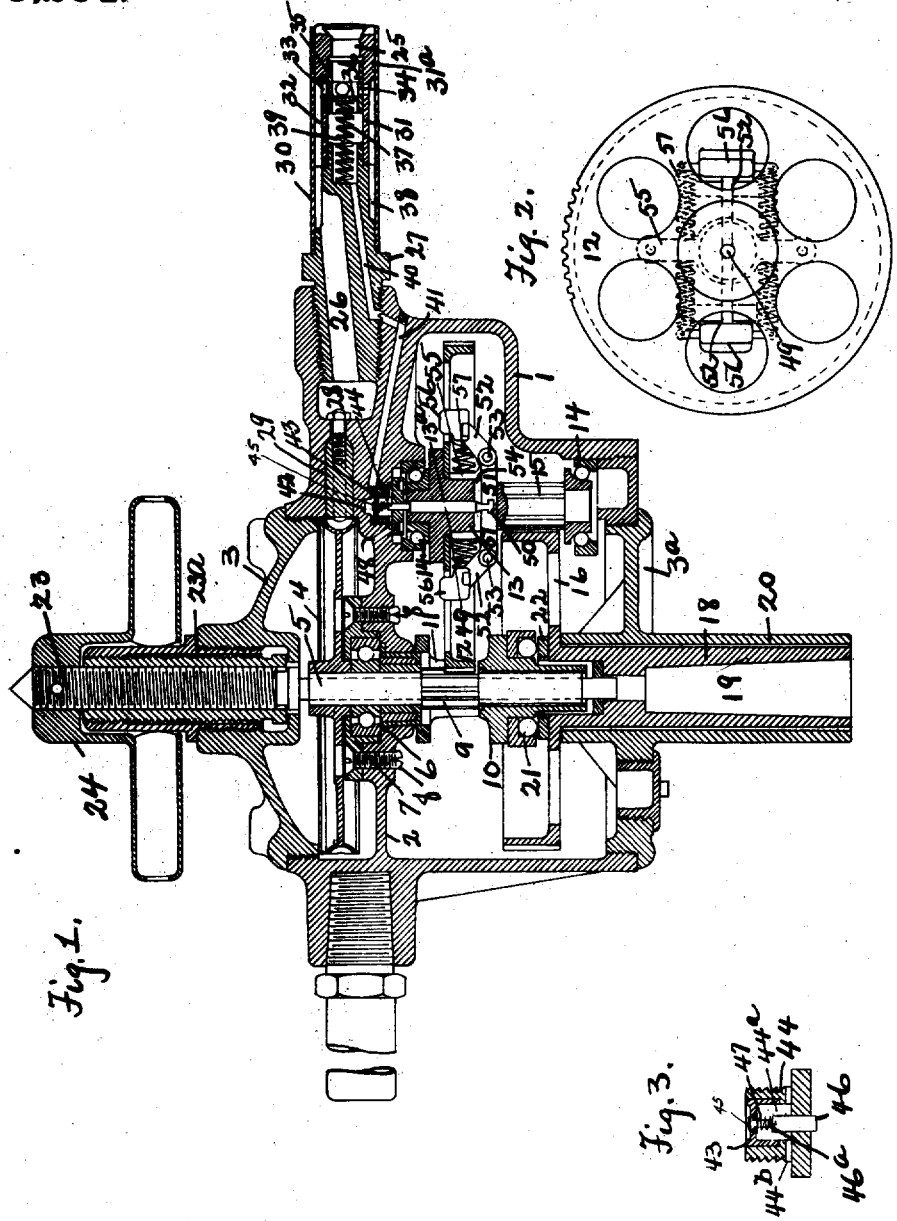
E. J. ARMSTRONG.
FLUID ACTUATED ENGINE.
APPLICATION FILED APR. 10, 1908.
903,264.
Patented Nov. 10, 1908.

EDWIN J. ARMSTRONG, OF ERIE, PENNSYLVANIA.

FLUID-ACTUATED ENGINE.

No. 903,264.    Specification of Letters Patent.    Patented Nov. 10, 1908.

Application filed April 10, 1908. Serial No. 426,309.

*To all whom it may concern:*

Be it known that I, EDWIN J. ARMSTRONG, a citizen of the United States, residing at Erie, in the county of Erie and State of Pennsylvania, have invented new and useful Improvements in Fluid-Actuated Engines, of which the following is a specification.

This invention relates to fluid actuated engines, and consists in certain improvements in the construction thereof as will be hereinafter fully described and pointed out in the claims.

More particularly the invention relates to that type of fluid actuated engines, which are used with portable tools, and as shown in the accompanying drawings, the invention is exemplified in the form of a pneumatic drill, as follows:

Figure 1 shows a central vertical section through the drill. Fig. 2 a plan view of one of the intermediate gears of the transmission mechanism on which a governor is mounted. Fig. 3 an enlarged view of an auxiliary valve.

1 marks the case in which the mechanism is inclosed. This is formed with a partition 2 which divides the case into two compartments. The upper compartment is closed by a cover 3 which is screwed into the case 1, and the lower compartment is closed by a cover $3^a$ which is screwed into the case at the bottom. A turbine wheel 4 having buckets is arranged in the upper compartment which for convenience I term the turbine wheel compartment. This is fixed on a hollow shaft 5. The shaft 5 is mounted in the bearings 6. The bearings are closed to the turbine wheel compartment, and the bearings secured by means of a cap 7 secured to the partition 2 by the screws 8. The transmission compartment is thus entirely closed to the turbine compartment and being oil tight it may be supplied with lubricant for all the bearings.

A transmission mechanism is mounted in the lower compartment, which compartment I term for convenience the transmission compartment. The pinion 9 is fixed on a shaft 5. The lower end of the shaft extends into a bearing 10 which is supported by a bracket 11 extending from the case 1. The gear 9 meshes with a gear 12, the gear 12 being mounted on an intermediate shaft 13. This intermediate shaft is journaled in the ball bearing 14. A pinion 15 is fixed on the lower end of the shaft, and meshes with a gear 16, the gear 16 being fixed on a spindle 18. The spindle 18 is mounted in a bearing 20, the bearing being formed in the cover $3^a$. The spindle 18 has the socket 19 in which a tool may be secured. A ball bearing 21 is arranged in connection with the bearing 10, and operates against a thrust washer 22 on the gear 16.

A feed screw 23 is screwed into a threaded sleeve $23^a$ in the cover 3, and the wheel 24 is provided for actuating the feed screw. This operates in a manner common to structures of this kind.

The air or fluid is supplied through a passage 25. This is in communication with the passage 26 in a fitting 27. The fitting 27 is screwed into the case 1, and the passage 26 communicates with an annular chamber 28 from which leads the nozzle 29 in proper relation to the wheel 4. A sleeve 30 is screwed onto the fitting 27, and a valve sleeve 31 is arranged within the sleeve 30 forming a chamber 32 between the sleeve 30 and sleeve 31. The end of the sleeve 31 has the enlargement $31^a$ which forms a complete closure in the sleeve 30. The sleeve 31 is provided with the radial openings 33 which register with the openings 34 in a cylindrically shaped valve 35. This valve has a closure 36 at one side of the opening 34, and a spring 37 maintains the valve normally in an open position. The end of the projection 27 is cut away at 38, so as to continue the chamber 32, and the chamber 32 connects with the passage 26.

A chamber 39 is formed back of the valve 35, and this chamber is connected by a passage 40 in the projection 27, and a passage 41 in the case 1 with a valve chamber 42. A valve seat 43 is arranged at one side of this chamber it being secured in the partition 2 by a screw threaded follower 44. A chamber $44^a$ is formed in this follower, and this has a passage $44^b$ which is connected by a passage 48 with the turbine wheel compartment. A valve 45 operates upon the seat 43. It is carried by a stem 46, having a shoulder $46^a$. A spring 47 is tensioned between this shoulder and the seat 43, and normally maintains the valve in a closed position. The shaft 13 has an opening $13^a$ at its axis in which a pin 49 is slidingly mounted. This pin has a head 50 which is engaged by the slotted ends 51 of the bell crank levers 52. The ends 51 extend into a slot 54 in the shaft 13 and are pivoted on pins 53 which are mounted on a frame 55. The frame 55 is secured to the under side of the gear 12. Centrifugal weights 56 are secured to the ends of the bell crank levers, these forming the centrifugal element of the governor, and springs 57 connect the weights and form the centripetal element of the governor.

When the device is operating normally the valve 45 is closed and there is sufficient leakage past the valve 35 to quickly fill the chamber 39 and connected passages so that in consequence the air trapped in this chamber and passage by the closure of the valve 45 approximates the pressure in the supply passages. The valve 35 under these conditions is practically balanced and is held open by the spring 37. When the speed of the device reaches a point above a desired maximum the centrifugal force of the weights 56 overcomes the springs 57, and in consequence the weights move outwardly, and the ends 51 of the bell crank lever move upwardly carrying with them the pin 49, and forcing the valve 45 open. This allows the trapped air in the chamber 39 and connected passages to escape by way of the chamber 44ª and passages 48. The supply pressure then operates upon only one side of the valve 35, and its area is so proportioned with relation to the strength of the spring 37, that it will readily overcome this spring and force a movement of the valve to close the opening. As soon as the speed is reduced to below the desired maximum the reverse of these movements takes place.
With turbine engines of this type it is desirable that the supply be completely shut off or turned on in full as distinguished from a throttling action of the governor. The use of the auxiliary valve makes this easy of accomplishment. It will be noted that when the auxiliary valve is closed its upper surface is subjected to the supply pressure, and this gives additional resistance to the centrifugal action of the weights, and as soon as the valve is started, this resistance is removed, so that in consequence the auxiliary valve is instantly opened, thus effecting an immediate and complete closing movement of the main valve with each actuation.
The leakage past the main valve is sufficient to insure an immediate opening of the main valve when the auxiliary valve closes.

What I claim as new is:

1. In a fluid actuated engine, the combination of an inclosing case, having two separated compartments, a turbine wheel compartment, and an oil tight compartment for a lubricant; a valve controlling the admission of motor fluid; a turbine wheel having buckets in the turbine wheel compartment; and a governor in the oil tight compartment actuated by the turbine wheel and controlling said valve.

2. In a fluid actuated engine, the combination of an inclosing case having two sepa- rated compartments; a valve controlling the admission of motor fluid; a turbine wheel in one of said compartments; a transmission mechanism in the other of said compartments comprising a series of gears; and a governor in the compartment with the transmission mechanism and controlling said valve.

3. In a fluid actuated engine, the combination of a turbine wheel; a driving and driven shaft in alinement with each other; an intermediate shaft; gears connecting the driving and driven shaft through the intermediate shaft; a valve controlling the supply of motor fluid; and a governor carried by the intermediate shaft and controlling the valve.

4. In a fluid actuated engine, the combination of an inclosing case, having two separated compartments; a turbine wheel in one of said compartments; a driving shaft; a driven shaft; an intermediate shaft, gears connecting said shafts to transmit the movement of the driving shaft to the driven shaft through the intermediate shaft, the intermediate shaft and the gears being arranged in the other of said compartments; a valve controlling the motor fluid supply; and a governor carried by the intermediate shaft and controlling said valve.

5. In a fluid actuated engine, the combination of an inclosing case having two separated compartments, a turbine wheel in one compartment; a main valve controlling the motor fluid supply; an auxiliary valve controlling the main valve; a governor mounted in the other of said compartments and actuated by said turbine wheel and controlling said auxiliary valve.

6. In a fluid actuated engine, the combination of a turbine wheel; a valve controlling the supply of fluid to said wheel, said valve being cylindrically shaped and having radial openings therein through which the supply fluid passes, means for normally balancing the fluid pressure on the valve; a governor actuated by the wheel; and devices controlled by the governor for controlling the fluid pressure on one side of the valve to control the valve.

7. In a fluid actuated engine, the combination of a turbine wheel; a valve controlling the supply of fluid to said wheel, said valve being cylindrically shaped and having radial openings therein; an annular chamber into which the radial openings lead; passages leading from said chamber to the turbine wheel; means for trapping the fluid back of the valve comprising a chamber within the annular chamber; a governor actuated by the wheel; and devices actuated by the governor controlling the escape of trapped fluid.

8. In a fluid actuated engine, the combination of an inclosing case; a turbine wheel; a fitting secured to the case having a passage

26 leading to the turbine wheel and a passage 27 for trapped fluid; a sleeve 30 secured to the fitting and connected with the passage 26; a sleeve 31 also secured to the fitting and arranged within the sleeve 30 forming a chamber between them, said sleeve having radial openings therein leading to the chamber; a valve in the sleeve 31 having radial openings in register with the openings in the sleeve; a spring tending to maintain the valve in an open position; a governor actuated by the wheel; and devices controlled by the governor for controlling the escape of the trapped fluid on the back side of the valve.

9. In a fluid actuated engine, the combination of a valve 35 having radial openings therein, and a closure 36 thereon; the sleeve 31 in which the valve is slidably mounted, said sleeve having a closure 31ª; a fitting 27 to which the sleeve 31 is secured, the sleeve forming a chamber 39 for trapping the fluid; a spring in the chamber; a sleeve 30 over the sleeve 31 and forming a chamber between the two sleeves for the passage of supply fluid.

10. In a fluid actuated engine, the combination of an inclosing case having two separated compartments; a turbine wheel in one compartment; a transmission mechanism in the other of said compartments; a valve controlling the supply to the turbine wheel; means for trapping fluid back of the valve; a governor in the compartment with the transmission mechanism; and devices actuated by the governor for controlling the escape of trapped fluid comprising a passage leading to the turbine compartment as an exhaust for the trapped fluid.

11. In a fluid actuated engine, the combination of an inclosing case having two separated compartments; a turbine wheel in one compartment; a governor in the other of said compartments; a valve controlling the supply of motor fluid to the wheel; means for trapping fluid back of the valve for controlling the action of the valve; and devices controlled by the governor for controlling trapped fluid comprising passages for exhausting the trapped fluid to the compartment having the turbine wheel.

12. In a fluid actuated engine, the combination of an inclosing case having two compartments with a separating partition between them, a turbine wheel in one of said compartments; a main valve controlling the supply of motor fluid to the turbine wheel; an auxiliary valve controlling the main valve, the auxiliary valve being mounted on the partition; and a governor in the other of said compartments controlling the auxiliary valve.

13. In a fluid actuated engine, the combination of an inclosing case having two compartments with a separating partition between them; a turbine wheel in one of said compartments; a main valve controlling the supply of motor fluid to the turbine wheel; an auxiliary valve controlling the main valve comprising a valve disk, the seat for the valve, and a follower for securing the seat in the partition, said follower having a chamber and spring actuated stem for the valve; and a governor in the other of said compartments acting upon said stem controlling the auxiliary valve.

14. In a fluid actuated engine, the combination of a turbine wheel; a valve controlling the supply of fluid to said wheel; means for normally balancing the fluid pressure on said valve; a governor actuated by said wheel; and devices controlled by the governor for controlling the fluid pressure on one side of the valve to actuate the valve, to move the valve immediately its full distance with each actuation.

15. In a fluid actuated engine, the combination of a turbine wheel; a valve controlling the supply of fluid to said wheel, said valve being subjected to the supply pressure at one side; means for trapping the fluid at the opposite side of the valve to vary the pressure on the valve; a governor actuated by said wheel; and devices controlled by the governor for controlling the escape of the fluid to control the valve, said devices being proportioned and arranged to move the valve immediately its full distance with each actuation.

In testimony whereof I have hereunto set my hand in the presence of two subscribing witnesses.

EDWIN J. ARMSTRONG.

Witnesses:
C. D. HIGBY,
K. R. KANE